US009253033B2

(12) United States Patent
Moran et al.

(10) Patent No.: US 9,253,033 B2
(45) Date of Patent: Feb. 2, 2016

(54) NETWORK MANAGEMENT SYSTEM INTEGRATED WITH PROVISIONING SYSTEM

(75) Inventors: William J. Moran, Wesley Chapel, FL (US); Michael T. Bayne, Wesley Chapel, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 497 days.

(21) Appl. No.: 11/615,197

(22) Filed: Dec. 22, 2006

(65) Prior Publication Data

US 2008/0155423 A1 Jun. 26, 2008

(51) Int. Cl.
*G06F 15/177* (2006.01)
*H04L 12/24* (2006.01)

(52) U.S. Cl.
CPC ........ *H04L 41/0806* (2013.01); *H04L 41/0253* (2013.01); *H04L 41/0213* (2013.01); *H04L 41/0233* (2013.01)

(58) Field of Classification Search
CPC ............ H04L 41/0806; H04L 41/0253; H04L 41/0213; H04L 41/0233
USPC .................. 715/733, 734, 735, 736, 740, 741
See application file for complete search history.

(56) References Cited

U.S. PATENT DOCUMENTS

| | | | | |
|---|---|---|---|---|
| 5,544,303 A | * | 8/1996 | Maroteaux et al. ........... 715/733 |
| 6,662,221 B1 | * | 12/2003 | Gonda ................ H04L 12/2697 |
| | | | | 370/254 |
| 6,903,755 B1 | * | 6/2005 | Pugaczewski .......... H04L 12/24 |
| | | | | 715/735 |
| 7,127,527 B1 | * | 10/2006 | Greenwalt ........ G06F 17/30569 |
| | | | | 709/203 |
| 7,280,529 B1 | * | 10/2007 | Black .................. G06F 11/1433 |
| | | | | 370/352 |
| 2003/0103077 A1 | * | 6/2003 | Despotidis .......... H04L 41/0806 |
| | | | | 715/734 |
| 2003/0204612 A1 | * | 10/2003 | Warren .................... H04L 69/08 |
| | | | | 709/230 |
| 2004/0098474 A1 | * | 5/2004 | Galou ................. H04L 41/0806 |
| | | | | 709/223 |
| 2004/0268258 A1 | * | 12/2004 | Lee et al. ....................... 715/708 |
| 2005/0081156 A1 | * | 4/2005 | Clark et al. .................... 715/736 |
| 2007/0294379 A1 | * | 12/2007 | Jiang ........................ H04L 41/04 |
| | | | | 709/223 |
| 2008/0120552 A1 | * | 5/2008 | Dagan et al. ................... 715/735 |
| 2011/0116452 A1 | * | 5/2011 | Welch .................... H04W 48/02 |
| | | | | 370/328 |
| 2011/0136513 A1 | * | 6/2011 | Chana et al. ............... 455/456.4 |

* cited by examiner

*Primary Examiner* — Anil Bhargava

(57) ABSTRACT

Preferred embodiments of the invention provide systems and methods to receive input from a user, the input including information associated with a change to a network element configuration; process the information associated with the change to a network element configuration, receive an indication from the network element that the network element configuration was successfully changed, and notify a provisioning system of the change to the network element configuration based on the indication from the network element configuration that the network element configuration was successfully changed.

20 Claims, 8 Drawing Sheets

NETWORK MANAGEMENT SYSTEM INTEGRATED WITH PROVISIONING SYSTEM

BACKGROUND INFORMATION

When users at a network operations center make changes to network element configurations, provisioning systems that may manage the inventory of a network are not notified of the changes to the network. Thus, the configuration of the network deviates from the inventory information stored in a provisioning system and inventory fallout occurs.

BRIEF DESCRIPTION OF THE DRAWINGS

In order to facilitate a fuller understanding of the exemplary embodiments of the disclosure, reference is now made to the appended drawings. These drawings should not be construed as limiting, but are intended to be exemplary only.

DETAILED DESCRIPTION OF PREFERRED EMBODIMENTS

A system and process of an exemplary embodiment of the disclosure provides integration of a provisioning system with a network management system.

Figure 1:
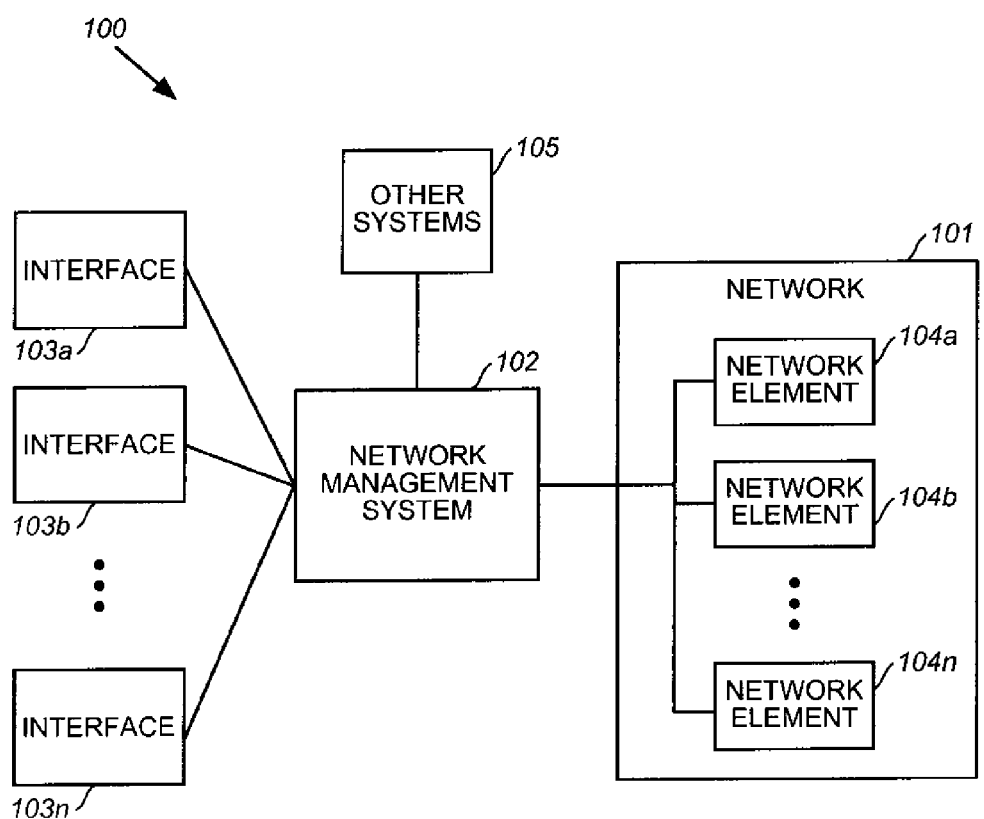
FIG. 1 illustrates an exemplary implementation of a system according to an embodiment of the disclosure.

FIG. 1 is an exemplary network system according to an embodiment of the disclosure. System 100 illustrates an exemplary system for supporting telecommunication networks, such as packet-switched based networks and/or circuit-switched based networks. As illustrated, one or more interfaces 103a-103n may be coupled to network management system 102 and network management system 102 may be coupled to network 101. The various components of system 100 may be further duplicated, combined and/or integrated to support various applications and platforms. Additional elements may also be implemented in the system to support various applications. Also, while one configuration is shown in FIG. 1, other configurations of these various units may also be implemented. For example, the various components of system 100 may be components within network 101 and network 101 may include one, or any number of the exemplary types of networks operating as a stand alone network or in cooperation with each other.

In various exemplary embodiments, network 101 may comprise one or more packet-switched based networks and/or circuit-switched based networks. As such, network 101 may include, for example, one or more Internet Protocol (IP) networks, wireless communication networks, and/or access networks including, without limitation, dial-up networks, digital subscriber line (DSL) networks, broadband wireless access networks, cable modem networks, integrated services digital networks (ISDN), symmetric high-speed digital subscriber line (SHDSL) networks, Ethernet networks, metro Ethernet networks, gigabit Ethernet networks, frame relay networks, asynchronous transfer mode (ATM) networks, synchronous optical networking (SONET) networks operating as a stand alone network or in cooperation with each other.

Network 101 may be associated with an entity and may provide network connectivity to its users (e.g., customers) For example, network 101 may be associated with a network access provider such as an Internet service provider (ISP) and or any other network access provider that may provide network connectivity to enable users (e.g., customers) of the network to transmit information via network 101; a global network provider such as an Internet backbone provider that may provide Internet backbone connection facilities around the world; a telephone network provider that may be part of a public switch telephone network; and/or a wireless communication network provider that may provide wireless broadband and/or mobile phone services to its users (e.g., customers).

Network 101 may be comprised of one or more network elements 104a-104n. In various exemplary embodiments, network elements 104a-104n may represent, for example, addressable, manageable hardware device(s) and associated software that may perform a telecommunication service function. Network elements 104a-104n may include, without limitation: devices associated with level one of the Open Systems Interconnection (OSI) reference model such as add/drop multiplexers, optical add/drop multiplexers, and/or like devices; devices associated with level two of the Open Systems Interconnection (OSI) reference model such as an asynchronous transfer mode (ATM) switch and/or any other like device; devices associated with level three of the Open Systems Interconnection (OSI) reference model such as routers, switches, and or any other like devices; and/or any other computer networking device that may transmit data across a network. In various exemplary embodiments, network elements 104a-104n may also represent, for example, automated telephone exchanges, digital switches, and/or other like devices associated with the public switch telephone network (PSTN).

The entity or entities associated with network 101 may manage network 101 via network management system 102. As illustrated in FIG. 1, network management system 102 may be coupled to network 101 and interfaces 103a-103n. In various exemplary embodiments, network management system 102 may provide a scalable network management application, for example, to manage devices (e.g., network elements 104a-104n) on network 101. Network management system 102 may also provide a web-based interface across Open Systems Interconnection (OSI) layers for network elements 104a-104n. Network management system 102 may also be coupled to other systems 105 and provide seamless integration with other systems 105. Other systems may include, for example, provisioning systems, operational support systems (OSS), and fault, configuration, accounting, performance, and security (FCAPS) systems.

Network management system 102 may support various functions associated with the management of network 101. For example, network management system 102 may support activation needs for provisioning requests to network elements 104a-104n; auto-discovery, reporting, reconciliation, and restoration needs for provisioning platforms; capabilities similar to those of an enterprise management system; and the ability to view or make changes to virtual devices without accessing the network element directly as described in greater detail below. In various exemplary embodiments, network management system 102 may be associated with users that may use network management system 102 to manage network 101, for example, and administrators that may configure and/or manage the network management system. Users may also refer to automated systems associated with the network management and/or users of other systems 105 and interfaces 103a-103n. Also, users may be administrators and whether a user may act as an administrator may be dependent upon privileges associated with the user as described in greater detail below.

Interfaces 103a-103n may represent any number of interfaces associated with supporting network management tasks. In various exemplary embodiments, interfaces 103a-103n may be referred to as northbound interfaces. As such, interfaces 103a-103n may send various logical requests to network management system 102, which may then transform the logical requests into native commands to a network element, for example. In an exemplary embodiment, interfaces 103a-103n may be associated with provisioning systems, operational support systems (OSS), and fault, configuration, accounting, performance, and security (FCAPS) systems. Accordingly, while FIG. 1 illustrates interfaces 103a-103n as being separate from other systems 105, other configurations may also be implemented. For example, interfaces 103a-103n may be interfaces to other systems 105.

Figure 2:
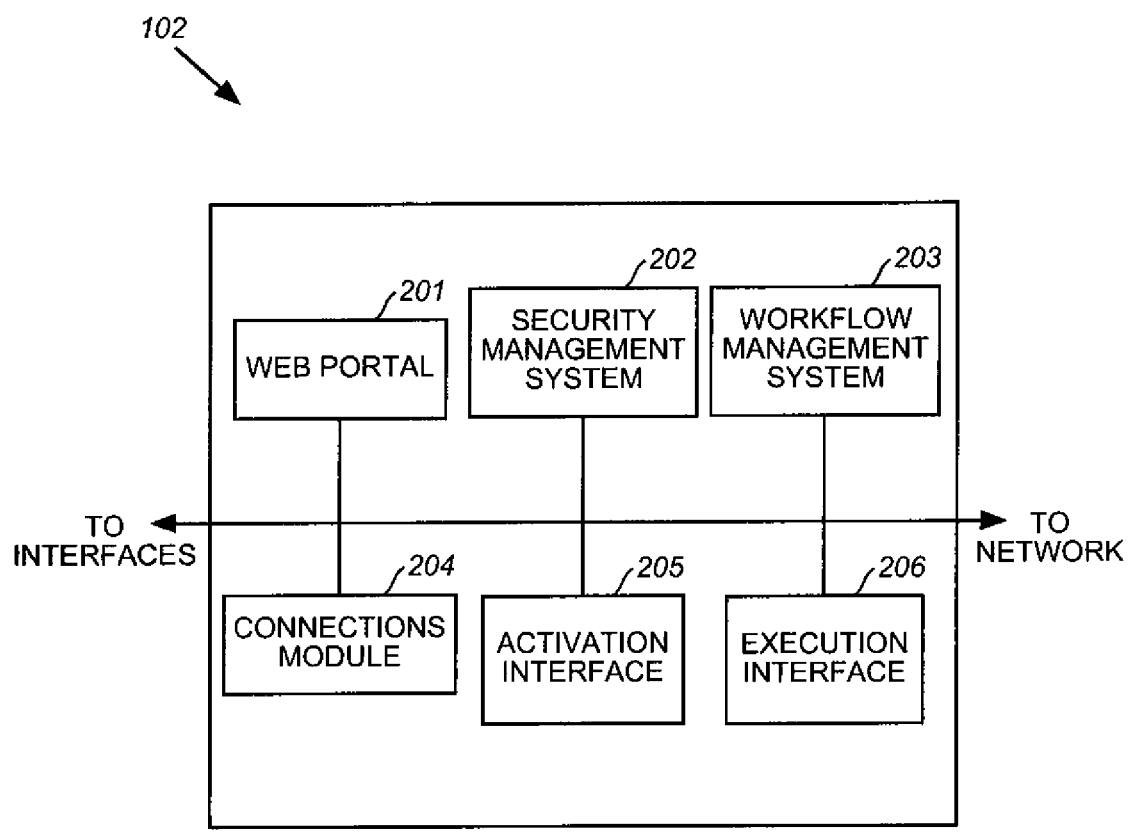
FIG. 2 illustrates an exemplary implementation of a network management system according to an embodiment of the disclosure.

FIG. 2 illustrates a network management system 102 according to various embodiments of the disclosure. As shown in FIG. 2, network management system 102 may include web portal 201, security management system 202, workflow management system 203, connections module 204, activation module 205, and execution module 206.

Figure 3:
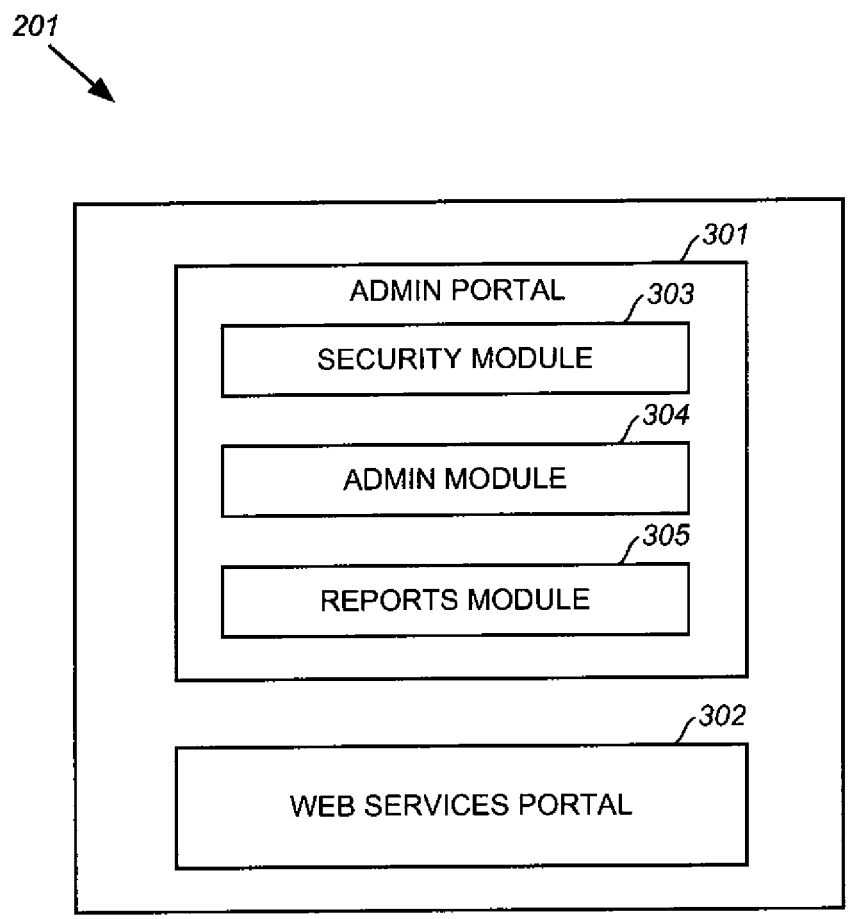
FIG. 3 illustrates an exemplary implementation of a web portal according to an embodiment of the disclosure.

FIG. 3 illustrates a web portal 201 according to various embodiments of the disclosure. As shown in FIG. 3, web portal 201 may include admin portal 301 and web services portal 302. Admin portal 301 may include security module 303, admin module 304 and reports module 305. Web portal 201 may provide a single interface to manage all activities associated with a network. For example, web portal 201 may provide a graphical user interface (GUI) that enables a single access point to all network elements within a network such that users may execute commands on a network element, add, delete, or modify network element configurations, troubleshoot and resolve network problems, and/or backup and restore deleted configurations. Web portal 201 may also provide a graphical user interface (GUI) that allows an administrator, for example, to add, delete or modify user profiles of users and/or user groups of the network management system, track all actions performed by users of the network management system, send messages to users of the network management system, run reports based on information contained within the network management system, and/or create credentials and map users that may be permitted to access a network element.

Figure 4:
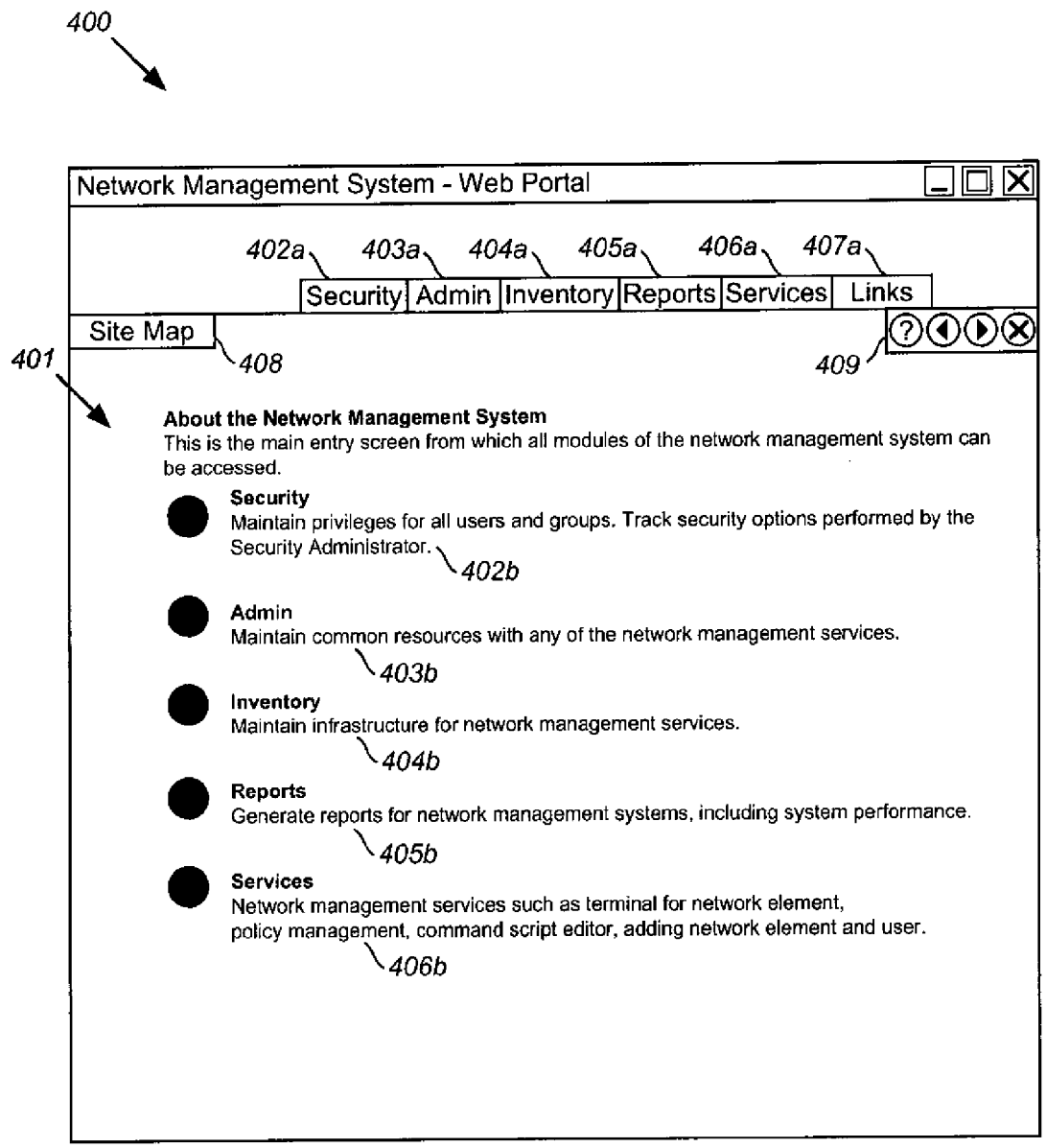
FIG. 4 illustrates an exemplary screen diagram of a web portal according to an embodiment of the disclosure.

In various exemplary embodiments, web portal 201 may be organized based on tabs. FIG. 4 depicts an exemplary embodiment of a screen diagram 400 which illustrates a web portal based on tabs. Screen diagram 400 may represent a graphical user interface (GUI) as described above with respect to web portal 201. Screen diagram 400 may include a main page 401 that may provide a main entry screen from which all modules of the network management system can be accessed. As shown in FIG. 4, screen diagram 400 may also include security tab 402a, admin tab 403a, inventory tab 404a, reports tab 405a, services tab 406a, and links tab 407a.

Each tab may enable users of the network management system to access different information and/or services associated with the respective tab. Also, each tab may be associated with different modules and/or portals of the network management system. For example, security tab 402a may be associated with a security module, admin tab 403a may be associated with an admin module, inventory tab 404a may be associated with an operations portal, reports tab 405a may be associated with a reports module, and services tab 406a may be associated with a web services portal.

Screen diagram 400 may also include various links on main page 401 that may be associated with the respective tabs. For example, main page 401 may include a security link 402b that may be associated with security tab 402a, an admin link 403b that may be associated with admin tab 403a, an inventory link 404b that may be associated with inventory tab 404a, a reports link 405b that may be associated with reports tab 405a, and a services link 406b that may be associated with services tab 406a. In an exemplary embodiment, if a user of the network management system wishes to navigate to one of the modules and/or portals associated with a tab, the user may activate (e.g., click on) the tab and/or the link, for example.

Screen diagram 400 may also include other navigational tools such as a site map button 408 and navigation buttons 409, which may enable a user of the network management system to navigate through the web portal or access a help page, for example.

Referring back to FIG. 3, in various exemplary embodiments, admin portal 301 may include a security module 303 which may allow an administrator to manage users of a network management system. Users of the network management system may be assigned privileges within the network management system by way of the roles, groups, and organizations to which they are associated.

Roles, for example, may be inherited by a user based on a user's group or organization. Exemplary roles may include, without limitation, system admin, admin, user, manager, and complex services user. Each role may include tab permission levels to determine whether or not a user can modify or view data. The tab permission levels may be associated with various tabs of a web portal as shown an described with respect to FIG. 4. For example, if a role has view privileges for a tab associated with the web portal, then the user may only view the data and not modify the data associated with the tab. Similarly, if a role has modify privileges for a tab, a user may modify the data associated with the tab.

User groups and/or organizations may represent a collection of users of the network management system that may have a common purpose within an organization associated with the network. For example, one user group may represent all users who share a similar job function. Also, a user group may represent all users who have access to a particular network element and/or group of network elements. For example, one user group may represent all users who have access to the network elements associated with a particular network operation center (NOC). User groups may also represent all users within a specific geographic region.

In various exemplary embodiments, an administrator may add and/or delete users and/or modify information associated with users. For example, security module 303 may include an "add user" tab that may enable an administrator to add a user and provide information associated with a user to create a user profile. The "add user" tab may include a "user information" tab and a "user privileges" tab which may provide an interface to enter information about a user and the privileges (e.g., roles and organizations) associated with the user, respectively. Security module 304 may also include a "modify user" tab that may enable an administrator to modify the information associated with users of the network management system. To modify the information associated with a user the "modify user" tab may enable a search for the respective user provide fields of information that may be modified. Security module 304 may also enable the administrator to delete users.

Security module 303 may also include an "audit trail" tab that may enable an administrator to track security-related actions on a per-user basis and/or a "command audit" tab that may enable an administrator to track all commands on a network element. For example, via an "audit trail" tab, an administrator may identify a user and track which network elements the user accessed. Similarly, via a "command audit" tab, an administrator may identify a particular network element and track all commands and/or requests that that may have been executed or are scheduled to be executed on a network element.

Admin portal 301 may also include an admin module 304 which may enable communication between and among users of the network management system. For example, admin module 304 may enable administrators to send banner messages to users of the network management system. In various exemplary embodiments, admin module 304 may include a "message center" tab that may enable an administrator to send a message to one or more users. Using the "message center" tab, an administrator, for example, may select individual users (by selecting a specific user identifier) or a group of users (by selecting a user group) and enter a message to be sent to the selected users. Users may also be able to send messages to other users using, for example, the "message center" tab. In doing so, users may be able to send message to other users based on privileges associated with the user sending the message.

Admin portal 301 may also include a reports module 305 which may enable reports to be generated that are related to, for example, the activities of users within the network management system. For example, reports module may enable "181 Day Reports" to be generated which may display a list of users who have not accessed the network management system in 181 days. In various exemplary embodiments, reports module 306 may enable the generation of other reports that may provide information about, for example, which network elements a particular user accessed, what commands were executed on a particular network element, and/or the like.

Figure 5:
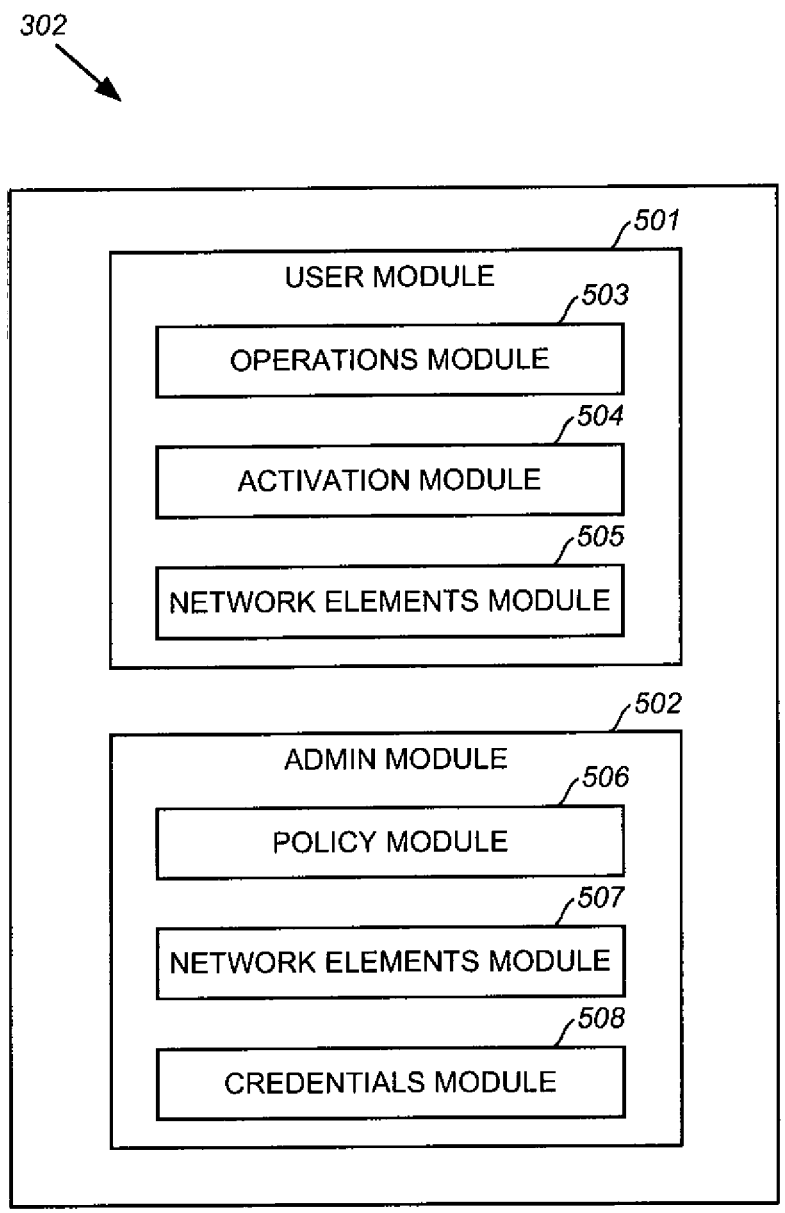
FIG. 5 illustrates an exemplary implementation of a web services portal according to an embodiment of the disclosure.

FIG. 5 depicts an exemplary embodiment of a web services portal 302 according to various embodiments of the disclosure. As shown in FIG. 5, web services portal 302 may include a user module 501 and an admin module 502. User module 501 may include an operations module 503, an activation module 504, and a network elements module 505. Admin module 502 may include a policy module 506, a network elements module 507, and a credentials module 508.

Operations module 503 may enable users of the network management system to execute commands on a network element and/or add, modify and/or delete network element configurations. Operations module 503 may also provide secure access to network elements to enable users to troubleshoot and resolve network problems.

Operations module 503 may include an "terminal" tab that may enable users to connect to a network element and enter commands to be executed on the network element. In an exemplary embodiment of the invention, to access the network element, operations module may log on to the network element in a manner that may be transparent to the user as described in greater detail below. Also, operations module 503 may batch all commands entered during a session and then commit the commands to the network element at one time, for example.

Figure 6:
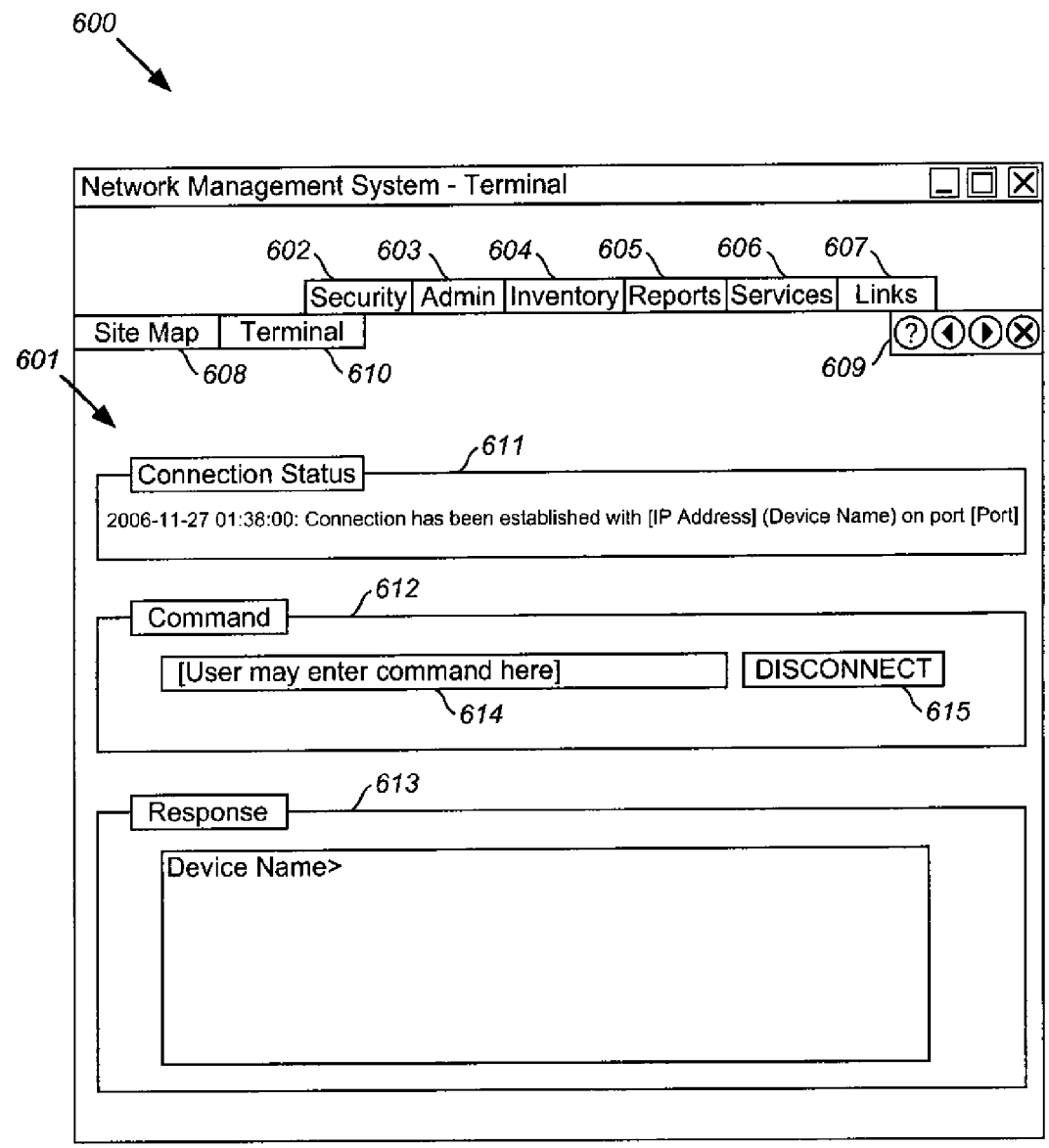
FIG. 6 illustrates an exemplary screen diagram of an operations module according to an embodiment of the disclosure.

FIG. 6 depicts an exemplary embodiment of a screen diagram 600 which illustrates an exemplary "terminal" tab according to various embodiments of the disclosure. As shown in FIG. 6, screen diagram 600 may include a "terminal" tab 601 which may be accessed by activating (e.g., clicking on) terminal tab button 610. Screen diagram 600 may also include a security tab 602 which may be similar to security tab 402a as described above, an admin tab 603 which may be similar to admin tab 403a as described above, an inventory tab 604 which may be similar to inventory tab 404a as described above, a reports tab 605 which may be similar to security tab 405a as described above, a services tab 606 which may be similar to security tab 406a as described above, a links tab 607 which may be similar to links tab 407a as described above, a site map button 608, navigation buttons 609, connection status portion 611, command portion 612, and response portion 613.

Using, information about a network element such as a network element identifier, protocol type, Internet protocol (IP) address and/or port number, a user may search for and locate a device (e.g., network element) that the user desires to access. In an exemplary embodiment, a user may only access network elements that the user has privileges to access based on the user's role and/or organization. Similarly, a user may only execute commands that the user has privileges to execute based on policies that may be associated with the user and/or user credentials.

Once a user has identified and/or accessed a network element, a user may interact with the network element via "terminal" tab 601. As shown in FIG. 6, connection status portion 611 may display the status of the connection between the network management system and the network element. For example, connection status portion 611 may indicate "Connection has been established with [IP Address] (Device Name) on port [Port]", where [IP address represents an Internet protocol (IP) address of the network element, "(Device Name) represents a unique identifier of the device, and"[Port] represents the port number. Using command portion 612, a user may enter commands into command field 614. For example, a user may enter transaction language one (TL1), common object request broker architecture (CORBA), command line interface (CLI), and/or other like commands into command field 614. In various exemplary embodiments, different network elements may support different command sets. In these embodiments, the network management system may validate the different types of commands and commit the commands to the network element as described in greater detail below. Once the commands are entered, the commands may be displayed in response portion 613, for example. As noted above, operations module 503 may batch all commands entered during a session and then commit the commands to the network element at one time. Users may also activate (e.g., click on) disconnect button 615 to disconnect from a network element. Once disconnected, connection status portion 611 may indicate "Not Connected," for example.

Referring back to FIG. 5, activation module 504 may enable users to add, modify and/or manage scripts for other systems (e.g., other systems 105) that may interface with the network management system. In various exemplary embodiments, data sent from other systems may be converted into, for example, transaction language one (TL1) commands. The scripts may represent a set of commands that an other system may apply to a network element.

In various exemplary embodiments, a script may include, without limitation, the following three components: a tree structure, a validation script, and a configuration script. The tree structure may represent the extensible markup language (XML) command structure. The validation script may include a set of commands that may verify what already exists in the network element before performing a configuration script. For example, where a configuration script is associated with a cross connect, the validation script may validate whether a cross connect exists before executing a configuration script to establish the cross connect and utilize the ports. The configuration script may add, modify, and/or delete data. For example, a configuration script may create a cross connect. Other configuration scripts may define an Internet protocol (IP) interface, create a subnet, and build a border gateway protocol (BGP) interface to a neighbor router.

Activation module 504 may include an "activation template" tab that may enable users to add modify and manage template scripts. Template scripts may be used repeatedly to perform a particular task associated with a particular network element. Activation template scripts may be associated with a particular network element and/or type of network element. Also, users may access templates based on privileges of the user. Using the "activation template" tab, users having requisite privileges may add, modify and/or delete template scripts to be executed by themselves and/or other users.

Activation module 504 may also include an "activation request" tab that may enable users to select an activation template and execute the script associated with the selected template on a network element. In various exemplary embodiments, this "activation request" tab may provide an alternate to issuing commands using, for example, the "terminal" tab as described above. Also, the "activation request" tab may enable users to schedule scripts to execute at a future date and time. When executing a script and/or template script, users may enter, for example, network element inputs and/or script input inputs that may be inserted into variable fields in the script. Users may also be able to preview the script having the inputs inserted into the variable fields before execution.

Network elements module 505 may enable users to add, delete, and/or modify network element configurations. Network elements module 505 may include an "add element" tab which may include various fields within which users may enter information about a network element. For example, the "add element" tab may include fields associated with a unique identifier, a host name of the network element, a device type to specify the model name for the network element, a device version to specify the release version of the network element, an Internet protocol (IP) address, a port number, a credential, a loop back, and or any other information associated with a network element. To add a network element, users may enter the information into the input fields and activate (e.g., click on) an add button associated with the "add element" tab.

To modify or delete a network element, users may search for the network element and once located, modify or delete the network element details, for example. A user may add, modify, and/or delete network element details based on the privileges associated with the user.

As noted above, admin module 502 may include a policy module 506. In various exemplary embodiments, a policy may refer to a set of commands that determine the commands a particular user and/or group of users may execute. Policy module 506 may enable administrators, for example, to add, delete, and/or modify a policy, and/or apply a policy to a group, role, user, or network element.

Admin module 502 may include a "manage policy" tab that may enable an administrator to manage the policies within the network management system. To create or modify a policy, an administrator may select a device from a list of devices displayed within the "manage policy" tab. Once selected, an administrator may view, for example, a list of commands that are permitted for that network element.

In various exemplary embodiments, a policy may be identified by an alphanumeric identifier. To add a policy, an administrator may locate a network element and enter an alphanumeric name into, for example a name field within the "manage policy" tab to associate the network element with the name of the policy. Each policy may have an associated default policy which may determine how the permissions will work. Exemplary default policies may include, without limitation, allow, deny, and/or abstain. Allow may represent that, by default, all commands may be allowed, except, for example, those commands that may be explicitly flagged by add, modify, delete, and/or query permission flags. Deny may represent that, by default, commands may be denied, except, for example, those commands that may be explicitly flagged by add, modify, delete, and/or query permission flags. Abstain may represent that no behavior may be defined. In an exemplary embodiment, selecting abstain may result in an implicit deny of any command.

Within the "manage policy" tab, an administrator may associate add, modify, delete, or query permissions to a command. An administrator may also apply a policy to groups, users, roles, or network elements. Doing so may define what commands may be executed by certain group(s), user(s), role (s), and on what network elements.

Admin module 502 may also include a network elements module 507 that may enable an administrator, for example, to return a network element to a state of a previous provisioning in the system. Returning a network element to a state of a previous provisioning may provide disaster recovery for a network element, for example. Network elements module 507 may include a "network element reconcile" tab that may enable an administrator to locate a network element by searching for the network element and select any number of commands from a list of commands provided with the "network element reconcile" tab and re-execute the selected commands.

Admin module 502 may also include a credentials module 508 that may enable an administrator to map users and groups to a network element. In various exemplary embodiments, each network may be associated with a network element ID and a password. As described in greater detail below, the network management system to connect to the network element in a manner that may be transparent to a user. A user may not be able to access a network element until the user is mapped to the network element.

A credential may be associated with a credential name, a network element ID, and a password of the network element. Credentials module 508 may include a "credential mapping" tab that may enable an administrator to add a credential. To add a credential, the administrator may input information into, for example, credential name, network element, and network element password fields within the "credential mapping" tab. Once added, an administrator may associate users, user groups, and/or network element groups to the credential. Once a user is associated with a network element, the user may log on to the network element via the web portal, for example.

Referring back to FIG. 2, security management system 202 may provide generic security concepts to network management system 102 and network 101. For example, security management system 202 may provide credentials control, key escrow services, firewall rules management, access and controls specification, secured auditing and/or encryption/decryption services. These exemplary generic security concepts may then be utilized as a base services offering (i.e., a business delegate), to the network management system to provide a common mechanism for repetitive security-related events such as login credentials control to network elements.

In various exemplary embodiments, security management system 202 may also provide some or all of the data structures and/or algorithms associated with performing the functions of security module 303, policy module 506, network elements module 507, and/or credentials module 508 as described above.

Workflow management system 203 may manage work flow (or work unit flow) of the network management system. As described herein, work flow (or work unit flow) may represent a collection of work units. Generally, work flow may represent any operation performed by the network management system. For example, work flow may represent operations for connecting to a network element, communicating with a network, element, and/or interfacing with other systems. Programmatically, a work unit may represent an object that executes in the work flow and returns a state information to the workflow management system.

As noted above, network elements may represent addressable, manageable hardware device(s) and associated software that may perform a telecommunication service function. Each network element may expose one or more management interfaces that the network management system may use to communicate with and/or manage the network element. The management interfaces may use a variety of protocols, depending on the type of network element. These protocols may include, without limitation, simple network management protocol (SNMP), transaction language one (TL1), command line interface (CLI), extensible markup language (XML), common object request broker architecture (CORBA) and/or hypertext transfer protocol (HTTP).

In various exemplary embodiments, network management system 102 may provide a single interface to interact with a network element, regardless of the protocol used by the network element. Workflow management system 203 may define a different work unit type for each protocol. For example, workflow management system 203 may define a simple network management protocol (SNMP) work unit type, a transaction language one (TL1) work unit type, a command line interface (CLI) work unit type, extensible markup language (XML) work unit type, a common object request broker architecture (CORBA) work unit type, a hypertext transfer protocol (HTTP) work unit type and so forth.

Workflow management system 203 may manage interactions with numerous network elements at a given time. As noted above, to manage work flow, workflow management system 203 may use the state information returned by the work unit object. Although work unit objects may be defined for each protocol, workflow management system 203 may manage work flow using state transitions that are based upon patterns. In various exemplary embodiments, patterns may represent regular expressions that match data arriving on an incoming stream. Workflow management system may monitor incoming data streams for patterns that may be represented in three exemplary ways.

First, a good pattern may provide an indication to workflow management system 203 that the one or more operations specified in a command were performed successfully and that workflow management system can transition successfully. Second, a bad pattern may indicate that the transition was completed, the prompt was found, but an error message occurred during the runtime. Such an indication may mean that the transition is to enter a failure transition, for example. Moreover, when a bad pattern is identified, the workflow management system 203 may wait for a prompt from the network element. If an error message is received from the network element, there may be an unknown amount of time before the stream may flush to get caught up so the next pattern does not false hit on stream data. Third, an error pattern may indicate that a problem is found on the stream and the state of the link with the network element may no longer be important. If an error pattern is identified, the workflow management system 203 may enter an error state transition and allow for recovery.

Using the command line interface as an exemplary protocol, as noted above, workflow management system 203 may define a command line interface (CLI) work unit type. The command line interface (CLI) work unit type may be an object-oriented data structure that may define various functions for managing work flow. For example, the command line interface (CLI) work unit type may define a main execution function may send a command to a network element and wait for response patterns to be received from the network element. The command line interface (CLI) work unit may also define a command that may be sent to a stream and associated "get" and "set" functions to get and set the command, respectively. In an exemplary embodiment, the "get function may return a string value that is associated with the command.

The command line interface (CLI) work unit may also define good, bad and/or error patterns and associated functions for "adding" good, bad, and/or error patterns. Within the definition of the command line interface (CLI) work unit, a good pattern may indicate to the command line interface (CLI) work unit the pattern(s), when found, that may force the work flow into a good transition state. In an exemplary embodiment, a good pattern may indicate that the prompt was found and no error was generated by the network element. An error pattern may indicate to the command line interface (CLI) work unit the pattern(s), when found, that may force the work flow into a bad transition state. In an exemplary embodiment, an error pattern may indicate that a prompt was found at the same time an error pattern was found. For example, the network element may return the prompt with a percentage sign (%) to indicate that an error occurred. In this instance, when a prompt is returned with an error indication (%), the stream returned may the be scrubbed by workflow management system 203 to determine the error pattern. Scrubbing the stream in this manner may enable workflow management system 203 to understand the stream and make future transitions possible. A bad pattern may indicate that total recovery should occur. For example, the state of the stream may contain an error that requires connection invalidation, recovery, re-login and/or back-out. A bad pattern may be identified by workflow management system 203 by directly examining the stream before the prompt is returned.

Other protocol work unit types may be defined and workflow management system 203 may manage work flow using state transitions that are based upon patterns associated with the respective work unit types.

Connections module 204 provide and manage connections between network management system 102 and remote facilities such as, e.g., network elements and/or other systems. As noted above, network management system 102 may connect to various network elements using a number of different protocols and ports. Connections module 204 may define a model for which all connections may adhere to and provide a common mechanism for interfacing with a connection pool manager, for example. In an exemplary embodiment, the model and mechanism may be defined as an object-oriented classes or like data structure.

The common model, as defined in connections module 204 may define one or more methods for enabling connections to remote facilities. For example, connections module 204 may define a method to create a connection and/or handle to a remote facility and initiate credentials by executing the login workflow. In an exemplary embodiment, the creation of a connection may be executed as part of the work flow and managed by workflow management system 203. Connections module 204 may also define a method to close resources in use by a connection and remove a connection to a remote facility.

In various exemplary embodiments, depending on the protocol associated with a connection, connections module 204 may define a method to flush any data from a connection so that operations may start over.

Connections module 204 may also define a method that may validate the stability of a connection and return true if the connection id valid, or false otherwise. The implementation of this method may vary based on the protocol that is associated with a connection. Also, in an exemplary embodiment, method may provide an indication that a communication vehicle is valid, but not an indication of a logged in state.

Connections module 204 may also define methods to set the state of the connection, set and/or return the workflow utilized to keep the connection alive during idle periods, validate that a connection is in a "logged in" stat and that the connection is properly open, return a cache utilized in a connection, override a default cache created during object creation, store a connection pool manager, return a connection pool manager for a session, set a session identification for a current session, and/or return a stored session identification for the current session. In various exemplary embodiments, the session identification may be utilized by a connection pool manager to identify a connection.

As noted above, connections module 204 may provide a common mechanism for interfacing with a connection pool manager. Accordingly, connections module 204 may define a session manager to manage a connection pool. In various exemplary embodiments, the session manager may be defined as an object-oriented class and/or data structure. The session manager may define a function to "get" a connection. In an exemplary embodiment, given a session parameter, the function to "get" a connection may return a new connection from a pool or as a newly created connection. In such an embodiment, the session parameters may provide session specific data to generate the connection and/or pull a connection from a pool. The session manager may also define a "return" connection function that may return the connection back to a pool so that the connection may be returned back to a connection pool to be used by another thread that may require access to a remote facility. The session manager may define another connection that may "remove" a connection that may be determined to be totally invalid. In an exemplary embodiment, a connection that is "removed" may be completely closed so that it may not be reused.

Activation module 205 may provide a mechanism to implement an activation interface as described above with respect to activation module 504.

Execution module 206 may provide an interface that enables users of network management system to interact with network elements and/or other remote facilities (e.g., other systems 105). As such execution module 206 may enable execution of commands to a network element or other device. To do so, execution module 206 may provide a mechanism to receive one or more commands to be executed and pass the commands to an interface associated with the device on which the commands are to be executed, get a connection from a connection pool, process the list of commands based on the interface associated with the device on which the commands are to be executed, load the commands into work flow units, insert the connection into the work flow, and/or execute the work flow. In various exemplary embodiments, execution module 206 may execute commands based on a priority associated with the user and/or a priority associated with the command. For example, a user may be a high-priority user (e.g., an operations support user) and network troubleshooting commands executed by that user may be given a high priority. A user may also be a low-priority user (e.g., a provisioning system user) and provisioning commands executed by that user may be given a lower priority. In various exemplary embodiments, the priority of a user may be assigned dynamically.

In an exemplary embodiment of the invention, a provisioning system may provide telecommunication services to a user or a customer. In various exemplary embodiments, when customer orders and/or changes service requirements, an order may be generated in provisioning system to enable the services via a network. For example, when customer orders digital subscriber line (DSL) service from an Internet Service Provider (ISP), a provisioning system associated with the Internet service provider (ISP) may generate an order to create a digital subscriber line (DSL) circuit for the customer such that the customer may utilize resources in the network to obtain an Internet connection via the digital subscriber line (DSL) circuit. The creation of the digital subscriber line (DSL) circuit for the customer may result in a change to the configuration of network elements on the network. Also, when a customer terminates or modifies service from an Internet Service Provider, the provisioning system associated with the Internet service provider (ISP) may generate an order to terminate or modify the service. This modification or termination may also result in a change to the configuration of network elements. Other actions including, without limitation, a speed change (e.g., from 5 MB to 15 MB), a customer move, and/or any other action that may result in changes to the configuration of network elements.

Figure 7:
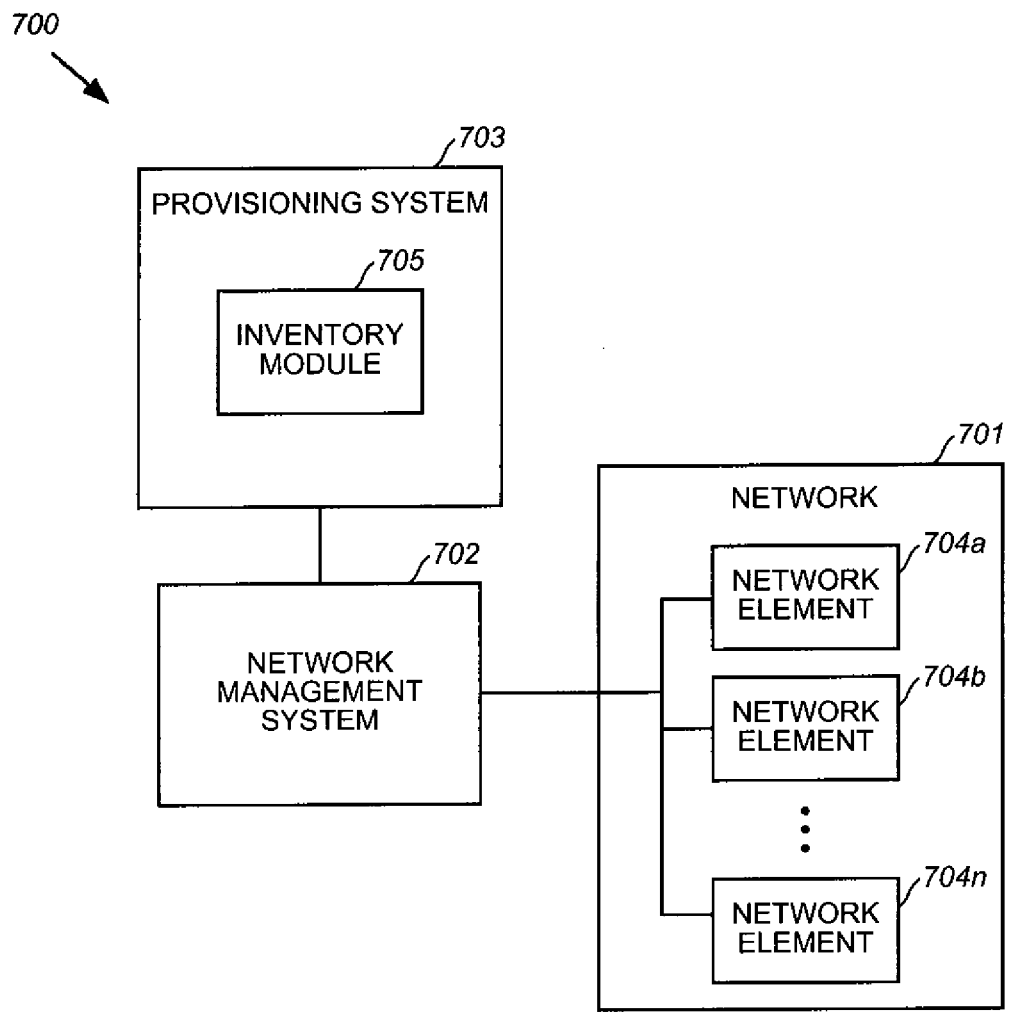
FIG. 7 illustrates an exemplary implementation of a system according to an embodiment of the disclosure.

A network management system may be integrated with the provisioning system, for example, to enable the maintaining of configuration information of network elements within the provisioning system. FIG. 7 depicts an exemplary system 700 for integrating a provisioning system with a network management system. As shown in FIG. 7, system 700 may include a network management system 702 coupled to a network 701 having network elements 704a-704n and a provisioning system 703 coupled to network management system 702. In various exemplary embodiments, network management system 702 may operate in a similar manner as described above with respect to network management 102 and network 701 having network elements 704a-704n may operate in a similar manner as described above with respect to network 101 and network elements 104a-104n, respectively.

Provisioning system 703 may receive and process orders for service and monitor and/or manage inventory of network 704. As shown in FIG. 7, provisioning system 703 may be coupled to network 701 by network management system 702. Provisioning system 703 may include an inventory module 705 to store existing network element configurations and manage inventory based on the stored network element configurations. In an exemplary embodiment, based on the stored existing network element configurations, inventory module 705 may maintain a virtual representation of free assets on network 701. Provisioning system 703 may utilize this virtual representation to allocate resources on the network to provide telecommunication services to customers.

In various exemplary embodiments, when a customer request and/or other provisioning order prompts a change to network element configurations, provisioning system 703 may examine the virtual representation to determine what free assets within the network may be allocated to effectuate the change prompted by the customer request and/or other provisioning system order. Provisioning system 703 may then determine one or more logical commands that may be associated with network management system 702 to re-configure the network elements in accordance with this change. Network management system 702 may receive these logical commands and use a configuration file associated with each network element(s) to determine one or more physical commands to be executed on the network elements(s). Network management system 702 may also receive physical responses from the network element(s) and use the configuration file associated with the network element(s) to "convert" the physical response into a logical response. Upon receipt of one or more logical responses indicating that the commands were successfully executed, network management system 702 may notify provisioning system 703 that the network configuration has changed based on the request from provisioning system 703. Provisioning system 703 may then modify the virtual representation of free assets accordingly.

Figure 8:
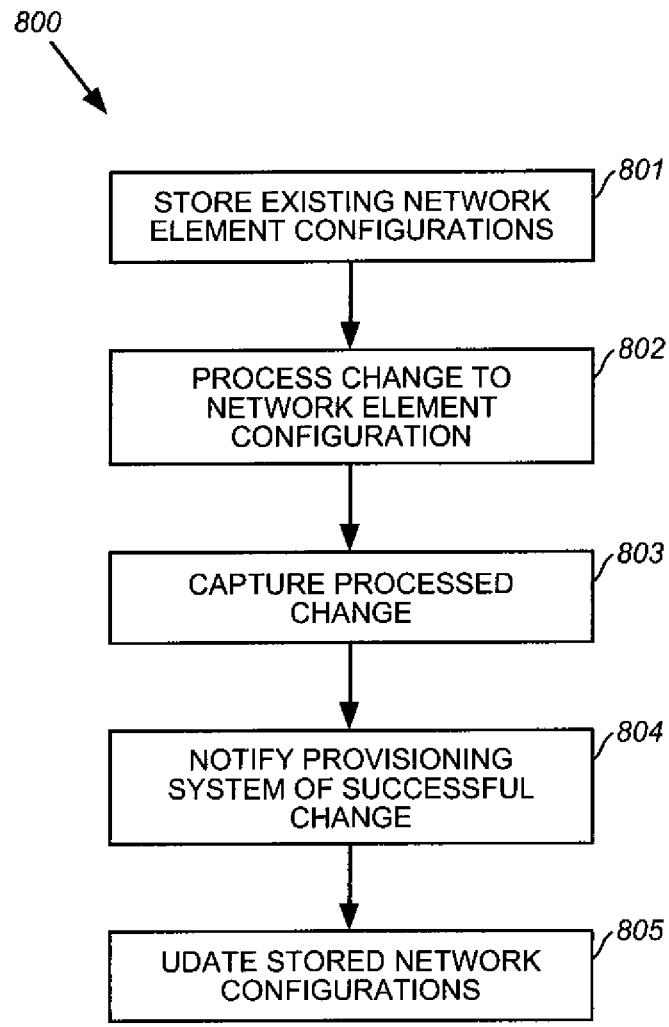
FIG. 8 illustrates an exemplary method integrating a provisioning system with a network management system according to an embodiment of the disclosure.

FIG. 8 depicts flow diagram 800 which illustrates an exemplary embodiment for integrating a provisioning system with a network management system. In block 801, existing network element configurations may be stored in a provisioning system. To store existing network element configurations, a database may maintain information associated with a physical inventory, information associated with a logical inventory, and information associated with assets tied with a specific customer. For example, inventory module 705 may store information indicating that there is a permanent virtual connection (PVC) from card 1/port 1 to card 5/port 3. In various exemplary embodiments, this information may represent an allocation of the network resources associated with card 1/port 1 and card 5/port 3.

In block 802, a change to the network element configuration may be processed. For example, a user of network management system 702 may use network management system 702 and/or a user of provisioning system 703 may use provisioning system 703 to delete the permanent virtual connection (PVC) from card 1/port 1 to card 5/port 3 and move the permanent virtual connection (PVC) to card 1/port 1 to card 3/port 5. In various exemplary embodiments, the user of network management system 702 may use and/or interact with, for example, a "terminal" tab (e.g., terminal tab 610) of network management system and/or a template script or other script as described above to perform the delete and move commands. A user of provisioning system 703 may use and/or interact with an interface associated with provisioning system 703 to perform the delete and move commands. The interface associated with provisioning system 703 may be an interface to network management system 702.

In various exemplary embodiments the delete and move commands may be logical commands when the commands are received by network management system 702. Network management system 702 may use a configuration file associated with the network element on which the command is being executed to "convert" the logical command into a physical command. Network management system 702 may bundle the commands and commit the physical commands to the network element using, for example, work units as described above. Network management system 702 may also receive an indication from the network element(s) that the command was successfully committed.

In block 803, network management system 702 may capture the processed change. For example, to capture the processed change, network management system 702 may process the work units and maintain the state of the change. To capture the processed change, the network management system may cooperate with agents that listen on the network for alarms associated with actions on the network. When an alarm occurs, the alarm may be propagated to the provisioning system if the provisioning system subscribes to an event associated with the alarm. Also, the provisioning system may search audit records of stat changes in the work flow to capture the state of the change. In various exemplary embodiments, network management system 702 may capture the processed change at the same time the network management system process the change.

In block 804, network management system 702 may notify provisioning system 703 that the change was successful. For example, network management system 702 may notify provisioning system 703 that the permanent virtual connection (PVC) was deleted from card 1/port 1 to card 5/port 3 and moved to card 1/port 1 to card 3/port 5. The network management system may notify the provisioning system via an alarm or via audit records as described above.

In block 805, provisioning system 703 may update the information stored in inventory module 705.

In various exemplary embodiments, prior to processing the change to the network element configuration, network management system 702 may determine whether the user is permitted to commit the commands to the network element. Network management system 702 may determine whether the user is permitted to access the network element and/or commit the commands to the network elements based on privileges of the user that may be maintained by network management system 702. If the user is not permitted, network management system 702 may generate an error.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A system comprising:
one or more processors to:
receive inputs from a plurality of users via a user interface,
each of the inputs indicating information associated with a change to a configuration of a network element of a plurality of network elements included in a network,
the information including one or more logical commands associated with at least one of a plurality of command protocols associated with a network management system;
process the information associated with the change to the configuration of the network element for each of the inputs,
the processing the information including converting the one or more logical commands into one or more native commands that are executed by a command protocol associated with the network element;

receive an indication from the network element that the configuration of the network element was successfully changed;

notify a provisioning system of the change to the configuration of the network element based on the indication from the network element;

update a database that stores data related to a virtual representation of free assets associated with the network based on the information associated with the change to the configuration of the network element;

search for the network element based on another user input via the user interface;

identify a list of commands previously executed by the network element;

receive a selection, via the user interface, of a command from the list of commands; and cause the network element to re-execute the command based on the selection.

2. The system of claim 1, where the one or more processors, when processing the information associated with the change to the configuration of the network element, are to:

connect to the network element and commit the one or more logical commands to the network element using one or more work units.

3. The system of claim 1, where the user interface comprises a graphical user interface associated with the network management system.

4. The system of claim 3, where the network management system couples the provisioning system with the network element.

5. The system of claim 1, where the network management system comprises a web portal and the user interface is associated with the web portal.

6. The system of claim 1, where the one or more processors are further to:

determine whether a user is permitted to connect to the network element based on privileges associated with the user; and where the one or more processors, when processing the information associated with the change to the configuration of the network element, are to:

process the information based on whether the user is permitted to connect to the network element.

7. The system of claim 6, wherein, based on a determination that the user is permitted to connect to the network element, the one or more processors are to:

determine whether the user is permitted to commit the one or more logical commands to the network element based on the privileges associated with the user.

8. The system of claim 7, where the one or more processors, when processing the information associated with the change to the configuration of the network element, are to:

process the information only if the user is permitted to connect to the network element and commit the one or more logical commands to the network element.

9. The system of claim 1, where the one or more processors, when selectively tracking, are to:

track which networks elements, of the plurality of network elements, had configurations changed by the user via the user interface; and track a plurality of logical commands committed to the network element by more than one of the plurality of users via the user interface.

10. The system of claim 1, where the one or more processors are further to:

receive a tracking input via the user interface,
the tracking input identifying at least one of a user, of the plurality of users, to be tracked or the network element to be tracked; and selectively, based on the tracking input, track which networks elements, of the plurality of network elements, had configurations changed by the user via the user interface or track a plurality of logical commands committed to the network element by more than one of the plurality of users via the user interface.

11. A non-transitory computer-readable medium storing instructions, the instructions comprising:

one or more instructions that, when executed by one or more processors, cause the one or more processors to:

receive inputs from a plurality of users via a user interface,
each of the inputs indicating information associated with a change to a configuration of a network element of a plurality of network elements included in a network,
the information including one or more logical commands associated with at least one of a plurality of command protocols associated with a network management system;

process the information associated with the change to the configuration of the network element for each of the inputs,
the processing the information including converting the one or more logical commands into one or more native commands that are executed by a command protocol associated with the network element;

receive an indication from the network element that the configuration of the network element was successfully changed;

notify a provisioning system of the change to the configuration of the network element based on the indication from the network element;

update a database that stores data related to a virtual representation of free assets associated with the network based on the information associated with the change to the configuration of the network element;

search for the network element based on another user input via the user interface;

identify a list of commands previously executed by the network element;

receive a selection, via the user interface, of a command from the list of commands; and cause the network element to re-execute the command based on the selection.

12. The non-transitory computer-readable medium of claim 11, where the one or more instructions, when executed by the one or more processors, further cause the one or more processors to:

generate a template script be is used repeatedly to change a configuration of at least one network element; and where the one or more instructions, that cause the one or more processors to process the information associated with the change to the configuration of the network element, cause the one or more processors to:

process the information based on the template script.

13. The non-transitory computer-readable medium of claim 12, where the one or more instructions, when executed by the one or more processors, further cause the one or more processors to:

modify the template script based on an input via the user interface.

14. The non-transitory computer-readable medium of claim 12, where the one or more instructions, that cause the one or more processors to receive the inputs from the plurality of users, cause the one or more processors to:
  receive a selection of the template script.

15. The non-transitory computer-readable medium of claim 12, where the template script is associated with a type of network element.

16. The non-transitory computer-readable medium of claim 12, where the template script is associated with a particular network element of the plurality of network elements.

17. The non-transitory computer-readable medium of claim 12, where the one or more instructions, when executed by the one or more processors, further cause the one or more processors to:
  receive a third input via the user interface,
    the third input identifying a user, of the plurality of users, to be tracked; and
  track, based on the third input, which networks elements, of the plurality of network elements, had configurations changed by the user via the user interface.

18. A method comprising:
  receiving, by a device, inputs from a plurality of users via a user interface,
    each of the inputs indicating information associated with a change to a configuration of a network element of a plurality of network elements included in a network,
    the information including one or more logical commands associated with at least one of a plurality of command protocols associated with a network management system;
  processing, by the device, the information associated with the change to the configuration of the network element for each of the inputs,
    the processing the information including converting the one or more logical commands into one or more native commands that are executed by a command protocol associated with the network element;
  receiving, by the device, an indication from the network element that the configuration of the network element was successfully changed;
  notifying, by the device, a provisioning system of the change to the configuration of the network element based on the indication from the network element;
  updating, by the device, a database that stores data related to a virtual representation of free assets associated with the network based on the information associated with the change to the configuration of the network element;
  searching, by the device, for the network element based on a first user input via the user interface;
  identifying, by the device, a list of commands previously executed by the network element;
  receiving, by the device, a selection, via the user interface, of a command from the list of commands; and
  causing, by the device, the network element to re-execute the command based on the selection.

19. The method of claim 18, further comprising:
receiving a second input via the user interface; and
returning the network element to a state of previous provisioning based on the second input.

20. The method of claim 18, further comprising:
receiving another input via the user interface,
  the other input identifying the network element to be tracked;
tracking, based on the other input, a plurality of logical commands committed to the network element by more than one of the plurality of users via the user interface.

* * * * *